USOO5689969A

United States Patent [19]
Conroy

[11] Patent Number: 5,689,969
[45] Date of Patent: Nov. 25, 1997

[54] AIR CONDITIONER CONDENSER FILTERING SYSTEM

[76] Inventor: Mitch Conroy, 128 Premium Way, Mississauga Ontario, Canada, L5B 1A2

[21] Appl. No.: 673,516

[22] Filed: Jul. 1, 1996

[51] Int. Cl.⁶ .......................... B01D 39/00; B01D 39/08; F25D 23/12
[52] U.S. Cl. .................... 62/262; 55/490; 55/511
[58] Field of Search .................. 62/262, 298; 55/422, 55/490–492, 511, DIG. 6, DIG. 13

[56] References Cited

U.S. PATENT DOCUMENTS

| | | | |
|---|---|---|---|
| 2,303,865 | 12/1942 | Roper | 62/262 |
| 2,425,417 | 8/1947 | Booth | 62/262 |
| 2,705,990 | 4/1955 | Miller | 62/262 |
| 2,842,199 | 7/1958 | Pfeiffer | 62/262 |
| 3,348,365 | 10/1967 | Dupre | 62/262 |
| 3,768,235 | 10/1973 | Meyer et al. | 55/490 |
| 4,257,791 | 3/1981 | Wald | 55/382 |
| 5,156,662 | 10/1992 | Downing et al. | 55/493 |
| 5,437,701 | 8/1995 | Townsley | 55/486 |

Primary Examiner—William Doerrler

[57] ABSTRACT

A new Air Conditioner Condenser Filtering System for preventing debris from collecting within a window air conditioner's condenser coils thereby extending the window air conditioner's life and efficiency. The inventive device includes a filtering means, a frame surrounding the filtering means, and a securing means removably attaching the present invention to a window air conditioner.

3 Claims, 3 Drawing Sheets

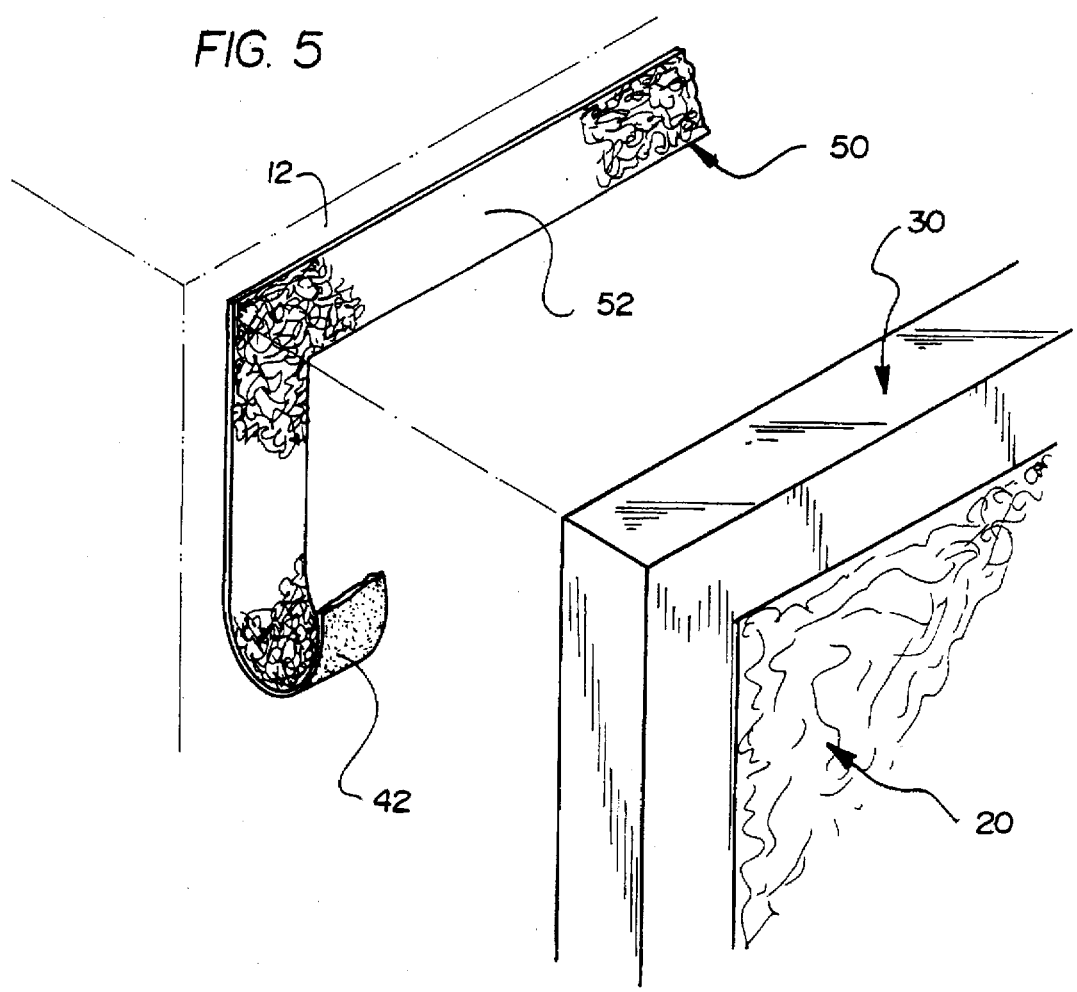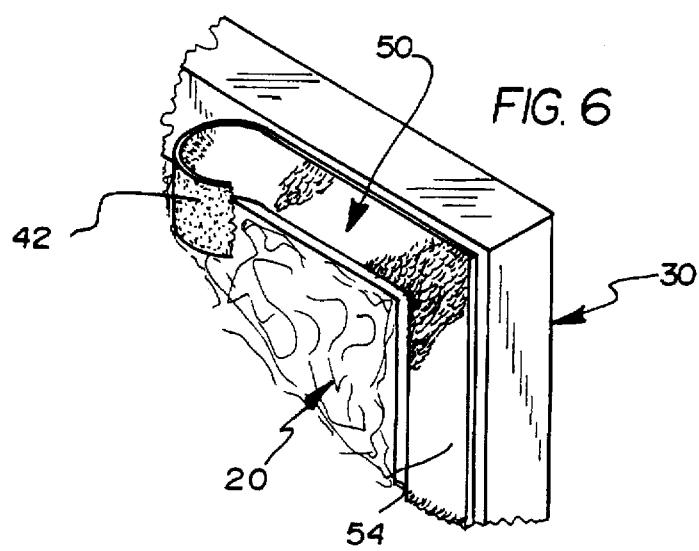

AIR CONDITIONER CONDENSER FILTERING SYSTEM

BACKGROUND OF THE INVENTION

1. Field of the Invention

The present invention relates to Filter Devices and more particularly pertains to a new Air Conditioner Condenser Filtering System for preventing debris from collecting within a window air conditioner's condenser coils thereby extending the window air conditioner's life and efficiency.

2. Description of the Prior Art

The use of Filter Devices is known in the prior art. More specifically, Filter Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Filter Devices include U.S. Pat. No. 4,961,849; U.S. Pat. No. 4,470,834; U.S. Design Pat. No. 244,691; U.S. Pat. No. 4,340,402; U.S. Design Pat. No. 244,538 and U.S. Pat. No. 4,373,635.

While these devices fulfill their respective, particular objectives and requirements, the aforementioned patents do not disclose a new Air Conditioner Condenser Filtering System. The inventive device includes a filtering means, a frame surrounding the filtering means, and a securing means removably attaching the present invention to a window air conditioner.

In these respects, the Air Conditioner Condenser Filtering System according to the present invention substantially departs from the conventional concepts and designs of the prior art, and in so doing provides an apparatus primarily developed for the purpose of preventing debris from collecting within a window air conditioner's condenser coils thereby extending the window air conditioner's life and efficiency.

SUMMARY OF THE INVENTION

In view of the foregoing disadvantages inherent in the known types of Filter Devices now present in the prior art, the present invention provides a new Air Conditioner Condenser Filtering System construction wherein the same can be utilized for preventing debris from collecting within a window air conditioner's condenser coils thereby extending the window air conditioner's life and efficiency.

The general purpose of the present invention, which will be described subsequently in greater detail, is to provide a new Air Conditioner Condenser Filtering System apparatus and method which has many of the advantages of the Filter Devices mentioned heretofore and many novel features that result in a new Air Conditioner Condenser Filtering System which is not anticipated, rendered obvious, suggested, or even implied by any of the prior art Filter Devices, either alone or in any combination thereof.

To attain this, the present invention generally comprises a filtering means, a frame surrounding the filtering means, and a securing means removably attaching the present invention to a window air conditioner.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Such as forced air condenser fan type refrigerators.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Air Conditioner Condenser Filtering System apparatus and method which has many of the advantages of the Filter Devices mentioned heretofore and many novel features that result in a new Air Conditioner Condenser Filtering System which is not anticipated, rendered obvious, suggested, or even implied by any of the prior art Filter Devices, either alone or in any combination thereof.

It is another object of the present invention to provide a new Air Conditioner Condenser Filtering System which may be easily and efficiently manufactured and marketed.

It is a further object of the present invention to provide a new Air Conditioner Condenser Filtering System which is of a durable and reliable construction.

An even further object of the present invention is to provide a new Air Conditioner Condenser Filtering System which is susceptible of a low cost of manufacture with regard to both materials and labor, and which accordingly is then susceptible of low prices of sale to the consuming public, thereby making such Air Conditioner Condenser Filtering System economically available to the buying public.

Still yet another object of the present invention is to provide a new Air Conditioner Condenser Filtering System which provides in the apparatuses and methods of the prior art some of the advantages thereof, while simultaneously overcoming some of the disadvantages normally associated therewith. To date, no such filter system exists which is specifically designed for filtering condensers.

Still another object of the present invention is to provide a new Air Conditioner Condenser Filtering System for preventing debris from collecting within a window air conditioner's condenser coils thereby extending the window air conditioner's life and efficiency.

Yet another object of the present invention is to provide a new Air Conditioner Condenser Filtering System which includes a filtering means, a frame surrounding the filtering means, and a securing means removably attaching the present invention to a window air conditioner.

Still yet another object of the present invention is to provide a new Air Conditioner Condenser Filtering System that is removably secured to the window air conditioner so the user may clean the filtering means.

Even still another object of the present invention is to provide a new Air Conditioner Condenser Filtering System that increases the efficiency of the window air conditioner thereby reducing electricity usage and reduces maintenance/Service costs either steamcleaning or compressor replacement etc.

Still another object of the present invention is to provide a new Air Conditioner Condenser Filtering System that reduces service requirements for the window air conditioner because of debris collected in the condenser coils.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is another securing means comprising a hook and loop fastening means where the female Velcro is secured to the window air conditioner.

FIG. 6 is a view of the hook and loop fastening means with male Velcro secured to the rear of the frame.

DESCRIPTION OF THE PREFERRED EMBODIMENT

Figure 1:
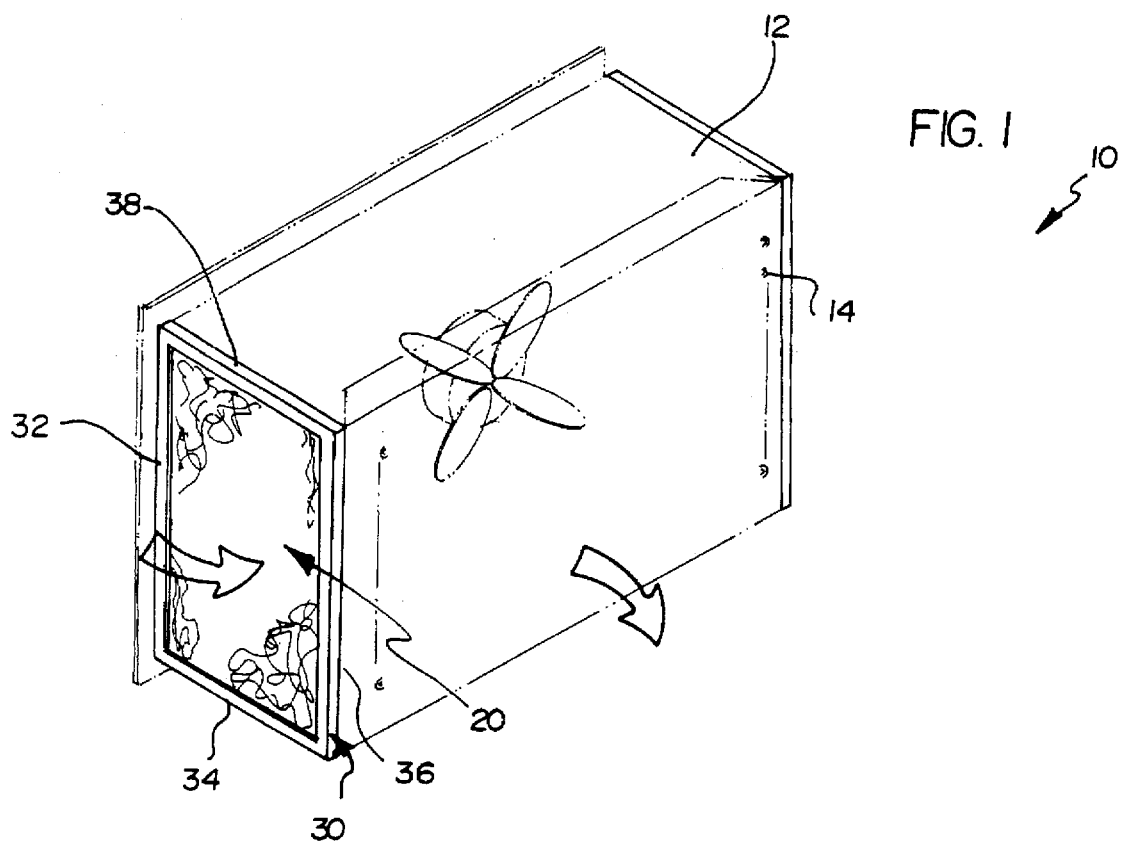
FIG. 1 is a left side perspective view of a new Air Conditioner Condenser Filtering System according to the present invention.

With reference now to the drawings, and in particular to FIGS. 1 through 6 thereof, a new Air Conditioner Condenser Filtering System embodying the principles and concepts of the present invention and generally designated by the reference numeral 10 will be described.

More specifically, it will be noted that the Air Conditioner Condenser Filtering System 10 comprises a swaged rectangular shaped frame 30, a filtering means secured to the frame 30, and an unnumbered securing means removably attaching the frame 30 over an air intake vent 14 of a window air conditioner 12, where the frame 30 completely surrounds the air intake vent 14.

Figure 2:
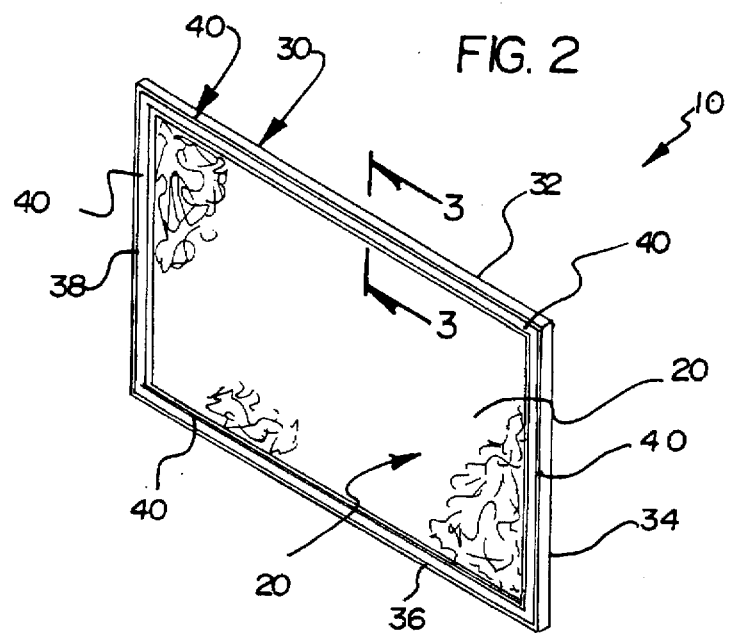
FIG. 2 is a rear view thereof disclosing the magnetic and/or adhesive strip used to secure the present invention to the window air conditioner.
Figure 3:
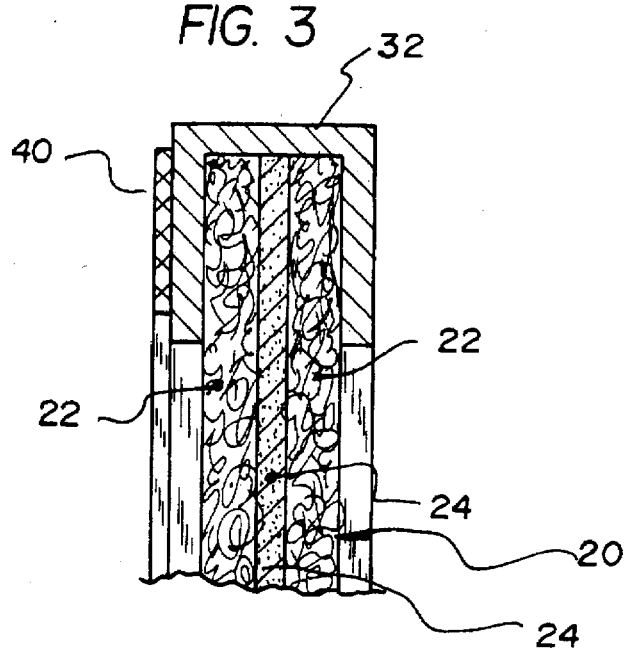
FIG. 3 is a cross sectional view taken along line 3—3 of FIG. 2 disclosing the filtering means in relation to the frame.
Figure 4:
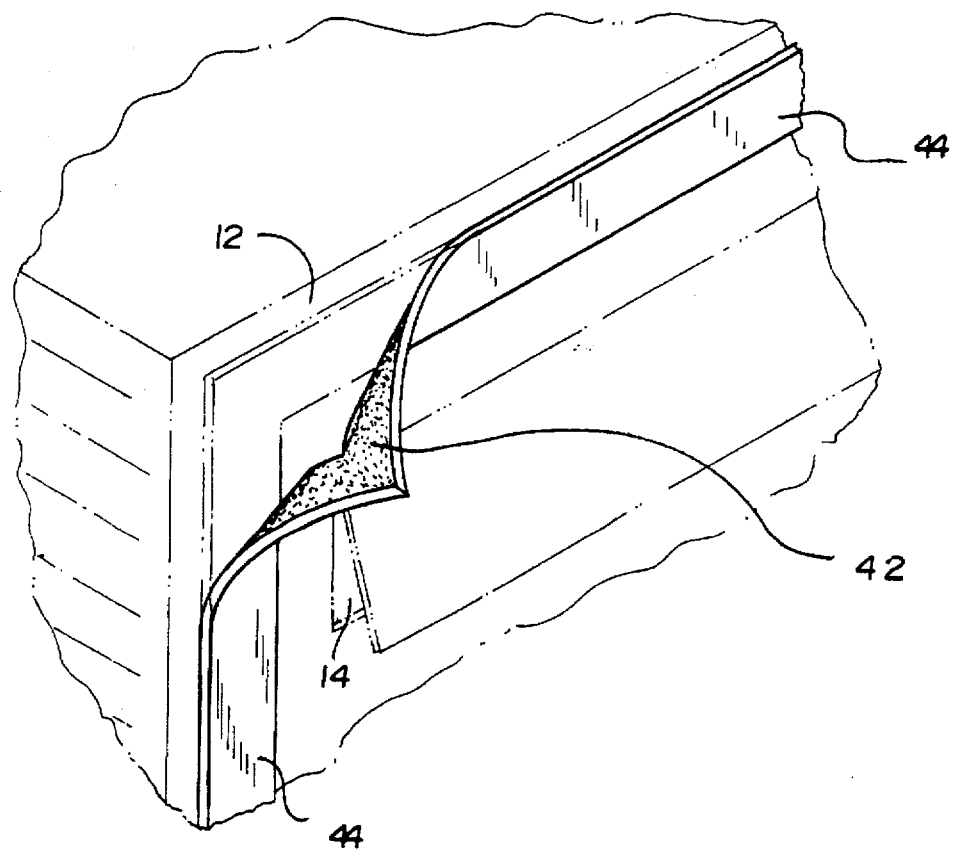
FIG. 4 is a view of a magnetic strip secured to the window air conditioner by securing tape.

As best illustrated in FIGS. 1 through 4, it can be shown that the filtering means includes at least two layers of a fiber filter 22. At least one foam filter 24 is positioned mesial the two layers of fiber filter 22 as best shown in FIG. 3 of the drawings. The frame 30 includes a top member 32 extending the horizontal width of the air intake vent 14. A left side member 34 is orthogonally secured to the top member 32 projecting vertically downward the vertical height of the air intake vent 14 as best shown in FIG. 2 of the drawings. A bottom member 36 is orthogonally secured to the left side member 34 opposite of the top member 32 projecting the horizontal width of the air intake vent 14. A right side member 38 is orthogonally secured to the bottom member 36 opposite of the left side member 34 projecting vertically upward and engaging the end of the top member 32 opposite of the left side member 34 forming a hollow rectangular shape. The unnumbered securing means includes a first magnetic strip 40 secured to side of the frame 30 engaging the window air conditioner 12 as best shown in FIG. 2 of the drawings. The unnumbered securing means further includes a second magnetic strip 40 secured to the window air condition surrounding the air intake vent 14 by a length of securing tape 42 if the window air conditioner 12 is constructed from plastic or aluminum as shown in FIG. 4 of the drawings.

Alternatively as shown in FIGS. 5-6 of the drawings, the unnumbered securing means includes a hook and loop fastening means 50 where a length of male velcro 54 is secured to the side of the frame 30 engaging the window air conditioner 12. A length of female velcro 52 engages the window air conditioner 12 surrounding the air intake vent 14 where the female velcro 52 and male velcro 54 removably engage one another as best shown in FIG. 5 of the drawings.

In use, the user secures the present invention to the window air conditioner 12 using the first magnetic strip 40 secured to the frame 30 covering the air intake vent 14. If the window air conditioner 12 is constructed from plastic or aluminum, the user then secures the second magnetic strip 44 to the window air conditioner 12 by utilizing the length of securing tape 42 so the first magnetic strip 40 removably engages the second magnetic strip 44. Alternatively, a hook and loop fastening means 50 replaces the magnetic strips 40 and 44. When the window air conditioner 12 operates, the air going through the unnumbered condenser coils is filtered through the filtering means 20 so as to prevent debris from collecting within the unnumbered condenser coils. When the filtering means 20 becomes contaminated, the user simply removes the present invention from the window air conditioner 12 and cleans the filtering means 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An Air Conditioner Condenser Filtering System comprising:

a swaged rectangular shaped frame;

a filtering means secured to the frame; and a securing means for removably attaching the frame over an air intake vent of a window air conditioner, where the frame completely surrounds the air intake vent;

wherein the securing means includes a first magnetic strip fixed to a side of the frame for magnetically holding said frame in a substantially sealed condition against said housing of said air conditioner about said air intake vent, wherein the filtering means includes:
at least two layers of a fiber filter; and
at least one foam filter positioned mesial the two layers of fiber filter;

wherein the frame includes:

a top member extending the horizontal width of the air intake vent;

a left side member orthogonally secured to the top member projecting vertically downward the vertical height of the air intake vent;

a bottom member orthogonally secured to the left side member opposite of the top member projecting the horizontal width of the air intake vent; and a right side member orthogonally secured to the bottom member opposite of the left side member projecting vertically upward and engaging the end of the top member opposite of the left side member forming a hollow rectangular shape; and wherein the securing means further includes a second magnetic strip secured to the window air conditioner surrounding the air intake vent by a length of securing tape, where the first magnetic strip magnetically demountably engages the second magnetic strip.

2. The Air Conditioner Condenser Filtering System of claim 1, wherein the securing means additionally includes a hook and loop fastening means, wherein a length of male velcro is secured to the side of the frame engaging the window air conditioner and a length of female velcro is secured to the window air conditioner at a location surrounding the air intake vent, and wherein the female velcro and male velcro removably engage one another.

3. An Air Conditioner Condenser Filtering System comprising:

a swaged rectangular shaped frame;

a filter secured to the frame; and a securing means removably attaching the frame over an air intake vent of a window air conditioner, where the frame completely surrounds the air intake vent;

wherein the securing means comprises a first magnetic strip secured to a side of the frame for magnetically engaging the air conditioner;

wherein the securing means further comprises a second magnetic strip secured to the window air condition surrounding the air intake vent by a length of securing tape, wherein the first magnetic strip magnetically demountably engages the second magnetic strip.

* * * * *